Sept. 20, 1938.　　　　R. P. ROSS　　　　2,130,966
APPARATUS FOR DISPLAYING INFORMATIONAL INDICIA
Filed July 9, 1936　　　5 Sheets-Sheet 1

Inventor
Ralph P. Ross
By Kimmel & Crowell
Attorneys

Sept. 20, 1938.  R. P. ROSS  2,130,966
APPARATUS FOR DISPLAYING INFORMATIONAL INDICIA
Filed July 9, 1936  5 Sheets-Sheet 2

Sept. 20, 1938.   R. P. ROSS   2,130,966
APPARATUS FOR DISPLAYING INFORMATIONAL INDICIA
Filed July 9, 1936   5 Sheets-Sheet 4

Inventor
Ralph P. Ross
By Kimmel & Crowell
Attorneys

Patented Sept. 20, 1938

2,130,966

UNITED STATES PATENT OFFICE 2,130,966

APPARATUS FOR DISPLAYING INFORMATIONAL INDICIA

Ralph P. Ross, Dallas, Tex., assignor, by mesne assignments, to Installment Securities Agency, Inc., Minneapolis, Minn., a corporation of Minnesota Application July 9, 1936, Serial No. 89,840

9 Claims. (Cl. 35—24)

This invention relates to an apparatus for displaying informational indicia designed primarily for the use and convenience of salesmen, brokers, etc. dealing in financial investments, as per example, insurance, annuities, retirement funds, for income purposes and others of a like general character, but it is to be understood that the apparatus, in accordance with this invention is for use in any connection which it may be found applicable.

The invention aims to provide, in a manner as hereinafter set forth, an apparatus of the class referred to including means for expeditiously exposing data for the purpose of enabling one to easily read the same to obtain the complete information desired relative to a particular subject.

Further objects of the invention are to provide, in a manner as hereinafter set forth, an apparatus for the purpose referred to which is comparatively simple in its construction and arrangement with respect to other forms of apparatus for the same purpose, strong, durable, compact, common for use relative to various forms of financial investments, conveniently operated to obtain the information desired, readily assembled, quickly repaired when occasion requires, and comparatively inexpensive to manufacture.

With the foregoing and other objects in view, the invention consists of the novel construction, combination and arrangement of parts as will be more specifically described and are as illustrated in the accompanying drawings wherein is shown an embodiment of the invention, but it is to be understood that changes, variations and modifications may be resorted to which fall within the scope of the invention as claimed.

The apparatus includes a housing formed of a cover section and a body section respectively designated at 1 and 2. The sections, preferably, are of rectangular contour and formed from any suitable sheet metal. The section 1 consists of a body part 3 formed at its outer side edge, at one end edge and at its other end edge with flanges 4, 5 and 6, respectively, which extend inwardly at right angles to said body part and with the flanges 5, 6 at their outer ends merging into the ends of the flange 4. The body part 3 at its inner side edge is formed with an outwardly directed upwardly inclined flange 7 of greater width than either of the said other flanges and free of connection to the inner ends of the flanges 5, 6. The body part 3 and the said several flanges have an outer covering 8 secured to the other faces thereof. The flange 4 at its free side edge is formed with a series of spaced integral endwise aligned barrels 9 for a purpose to be referred to. The flange 7 at its free side edge is formed with a series of spaced integral endwise aligned barrels 10 for a purpose to be referred to. The body part 3 in connection with the flanges 4, 5 and 6 form a storage chamber 11 which is normally closed by a closure member 12 formed of a body part 13 provided at each end and its inner side edge with a flange 14. The flange 14 extends inwardly at right angles to body part 13. The member 12 is formed of any suitable sheet metal and has extending from its outer side edge a series of spaced integral endwise aligning barrels 15 which are positioned between and align with the barrels 9. A pintle 16 is extended through and in connection with the aligned barrels 9, 15 provide for the hinging of section 1 and member 12 together. The flanges 14 extend towards and are of a width to not only seat on section 1, but for maintaining body part 13 aligned with the free edges of flanges 4, 5 and 6 when member 12 is in closing relation with respect to compartment 11. The member 12 at its inner side is formed with a tongue 17 to facilitate the opening movement thereof.

The housing section 2 comprises a body part 18 of rectangular contour, preferably, of sheet metal. The body part 18 includes an inner stretch 19, an intermediate stretch 20 and an outer stretch 21. The stretches 19 and 21 are inset with respect to stretch 20 thereby providing body part 18 from one end edge to the other end edge with a groove 22. The side walls of the groove are provided by the inner shoulders 23 at the points of mergence of the stretch 20 with the stretches 19, 21. At the point of mergence of the stretch 20 with the stretches 19, 21 outer shoulders 24, 25 are formed. The stretch 19 is of less width than that of the stretches 20, 21. The stretch 20 is of materially greater width than the stretches 19, 21. The body part 18 at its inner side has an inwardly disposed angle-shaped flange 26 formed of a vertical and a horizontal leg 27, 28, respectively. The leg 28 is at the outer end of leg 27, disposed at right angles to the latter and extends in a direction towards the outer side of said body part. The flange 26 is an integral part of stretch 19 and provides the latter with a groove 29. The legs 27, 28 are of like width.

Positioned against the outer face of stretch 19, abutting shoulder 24 and arranged in extended relation with respect to flange 26 is a hinge member 30 provided with spaced endwise aligned barrels 31 alternately arranged in opposed endwise aligned relation with respect to barrels 10. Extending through the aligned barrels 10, 31 is a pintle 32 whereby housing sections 1, 2 are hinged together. The member 30, preferably, is formed of sheet metal.

The section 2 includes a strip 33 of U-shaped contour in transverse cross section and of a length to extend from one end to the other end of body part 18. The strip 33 includes an outer side part 34, a bottom or base 35 and an inner side part 36. The side part 34 is of materially greater width than that of side part 36, but corresponds in width to that of stretch 21 of body part 18. The side part 36 is of less width than that of stretch 21. The bottom 35 of strip 33 is of materially less width than that of the side parts 34, 36. The said side part 34 is arranged against the outer face of stretch 21 and abuts the outer shoulder 25. The said bottom 35 opposes the outer side edge of stretch 21 and extends inwardly at right angles to the latter. The said side part 36 overlaps in spaced relation the stretch 21 and extends towards and aligns with the leg 28 of flange 26. The said bottom 35 in connection with the said side part 36 and stretch 21 coacts to form a deep groove 37 extending from one end to the other end of body part 18 and aligning with the groove 29. The strip 33 is preferably formed from sheet metal.

The member 30 is anchored to stretch 19 by the holdfast means 38. The strip 33 is anchored to stretch 21 by the holdfast means 39. The stretch 21 and strip 33 are cut away as at 40. There is common to body part 18, member 30 and strip 33 an outer covering 41 which extends against bottom 35 and on side part 36. The covering 41 is cut out and the edges of the latter register with the edges of the cutout 40.

The body part 18 is slit at spaced points and the material freed by the slits is inset relative to stretch 20 to form two oppositely disposed pairs of spaced holding tongues for a purpose to be referred to. The tongues are flush with the inner faces of the stretches 19, 21 and arranged in superposed spaced relation with respect to the inner face of stretch 20. The tongues of one pair are indicated at 42 and those of the other pair at 43.

Figure 10:
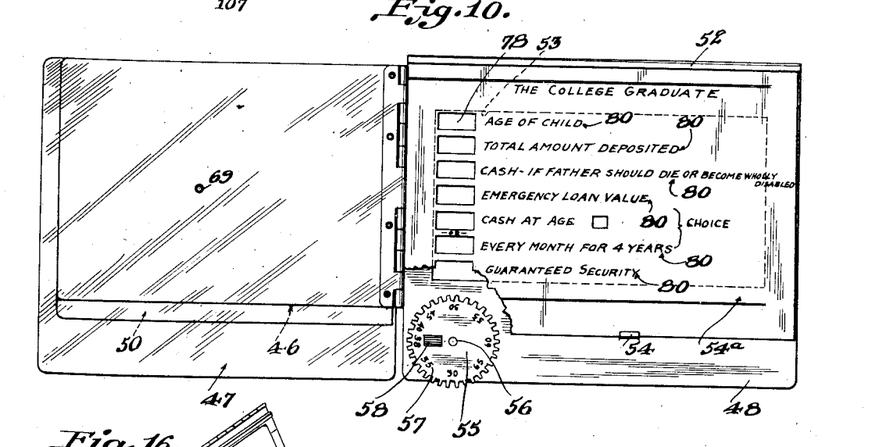
Figure 10 is an elevation, partly broken away of the carrier, with the leaves of the latter extended in relation to the other leaves thereof and further illustrating a data designator detachably connected to one of the leaves of the carrier.
Figure 11:
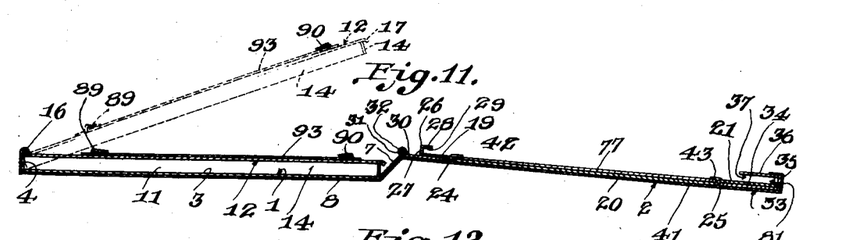
Figure 11 is a sectional view of the housing when the sections of the latter are in fully extended relation, taken on line 11—11, Figure 3.

The apparatus includes a book-like slidable indicia carrier 44 formed of a front cover section, hereinafter termed front, a back cover section hereinafter termed back and a plurality of leaves. As shown by way of example the carrier is set up with a pair of leaves. The front, back and leaves of the carrier are hinged together at one end. The front is indicated at 45. The leaves at 46, 47 and the back at 48. The front 45 consists of one piece of material formed of a non-transparent portion 49 and a transparent portion 50 disposed at and forming a continuation of the portion 49 at the bottom of the latter. The leaf 46 is non-transparent and corresponds in size to and has its edges flush with the edges of portion 49 of front 45. The leaf 47 is transparent and of greater size than, extends from the non-hinged side and bottom edges of the leaves 45, 46. The back 48 is non-transparent and of slightly greater size than leaf 47. The back 48 extends above the top edge, but is flush with the side and bottom edges of leaf 47. The front 45 and leaf 47 are preferably formed of Celluloid and the leaf 46 and the back 48 of sheet metal. The hinged connections between the front, the leaves and back of the carrier are indicated at 51. The back 48 is formed at its top with a fold 52 which overlaps and is spaced from the front face thereof. The fold 52 constitutes a retainer for a purpose to be referred to. The back 48, adjacent its hinged side, is formed with a large rectangular slot 53 for a purpose to be referred to. The back 48 is slit and the material freed by the slit is offset to provide a retainer 54 which is intersected by the transverse median of the back. The retainer 54 coacts with the retainer or fold 52 for the purpose of holding a designating data carrying card 54a against the front face of back 48 when desired. The retainer 54 is arranged between the horizontal median and bottom edge of back 48. The latter carries and has arranged against its front face, below slot 53 and in proximity to its hinged side a toothed rotatable disc 55 (Figure 10) mounted on a stud 56 anchored to back 48. The outer face of disc 55 is provided with an age indicating scale 57 of circular form from thirty to sixty-five arranged in progressively increasing divisions of fives, and coacting, when operated, with an age scale to be referred to. The outer face of disc 55 has also an indicator 58 inwardly of scale 57. The disc 55 is arranged relative to back 48 whereby a portion of the teeth of the disc will always extend from the bottom edge of such leaf at cutout 40.

Figures 12, 13, 14, 15:
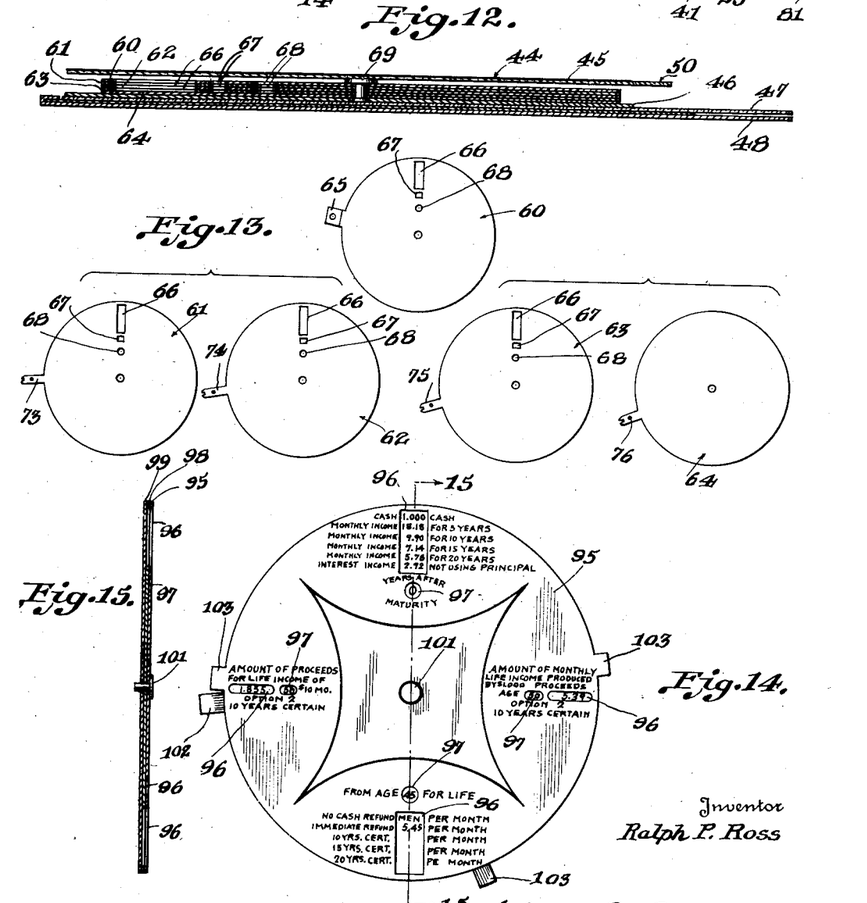
Figure 12 is a section on line 12—12, Figure 3.
Figure 13 is a disassembled view of the elements of an option data indicator.
Figure 14 is a front elevation of the insurance data indicator.
Figure 15 is a section on line 15—15, Figure 14.

The carrier also includes a data indicator 59 which is bodily carried by and disposed on the front face of leaf 46. The indicator 59 comprises a set of discs, preferably five in number, indicated at 60, 61, 62, 63 and 64. The number of the discs of indicator 59 may be increased or diminished if desired. The disc 60 is stationary and anchored to leaf 46, as at 65. Each of the discs 60, 61, 62 and 63 is formed with a rectangular slot 66, a square opening 67 and a circular opening 68 arranged in spaced alignment in a row disposed in radial relation with respect to the axis of indicator 59. The latter, axially thereof, is mounted on a headed screw stub shaft 69 carried by leaf 46. The discs 61, 62, 63 and 64 are revolubly mounted on shaft 69 and shiftable independently of each other. The normal position of the indicator 59 is when the slots and openings of the discs 60, 61, 62 and 63 register, as shown in Figure 12. The discs 61, 62, 63 and 64 carry data. The data on the disc 61 are exposible through the slot and openings in the disc 60. The data on disc 62 are exposible through the slots and openings in the discs 60, 61. The data on the disc 63 are exposible through the slots and openings in the discs 60, 61 and 62. The data on the disc 64 are exposible through the slots and openings in the discs 60, 61, 62 and 63. The disc 60 has its outer face provided with means, as at 70, for designating the purpose of the data exposed through its slot 66; with means, as at 71, for designating the purpose of the data exposed through its opening 67; and means, as at 72, for designating the purpose of the data exposed through its opening 68. The discs 61, 62, 63 and 64 have radially disposed handle tabs 73, 74, 75 and 76 respectively which will be provided with conventional means to indicate the purpose of the data on each disc. The tabs also facilitate the shifting of a selected disc for the purpose of exposing the data thereon.

The apparatus is to include a set of data carrying cards for use relative to the furnishing of financial benefits from cash deposits, each one of such cards illustrating the results of a certain specific plan. Only one specimen of these cards is shown and indicated at 77. The cards are termed "rate cards", designated by serial numbers, and each will contain various sets of data. A selected card 77 is to associate with a designator card 54a. The latter is formed with a column of superposed spaced rectangular slots 78 constituting windows for exposing a selected column of a series of spaced columns 79 of data on the card 77, viewed through the transparent leaf 47 and through the rectangular slot 53 in leaf 48. The card 54a is provided with conventional means in connection with each slot 78, as at 80, for designating the purpose of the data exposed through said slots. The card 54a, near its bottom edge, is formed with a triangular shaped slot 80a providing a window.

Figure 6:
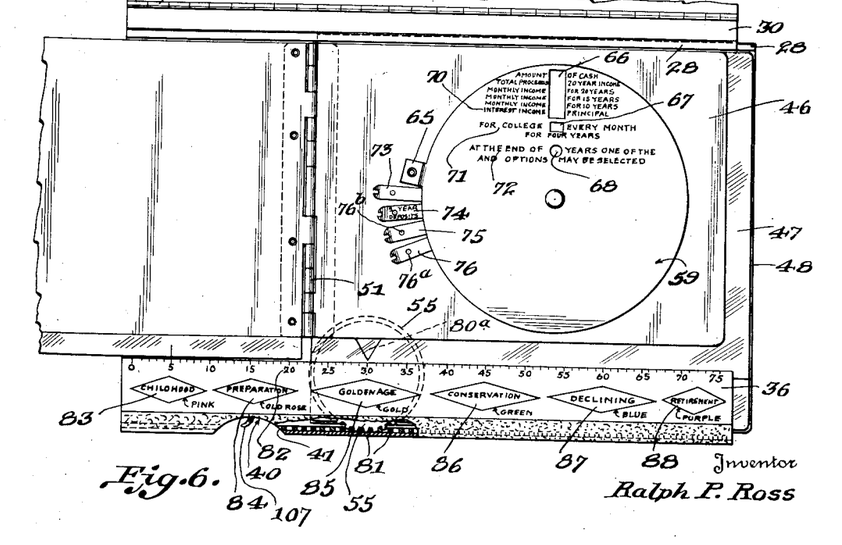
Figure 6 is a fragmentary view, upon an enlarged scale looking towards the inner face of the housing with certain of the elements of the apparatus carried by one of the sections of the housing disposed in extended relation with respect to another element of the apparatus carried by said section.
Figure 7:
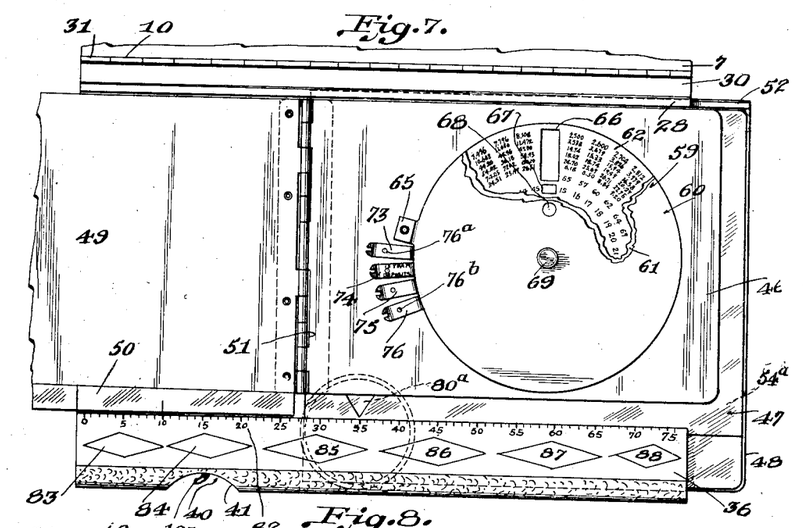
Figure 7 is a fragmentary view, upon an enlarged scale of the sectional housing, illustrating one of the sections of the latter, a book-like bodily slidable indicia carrier, formed of a front, a back and a plurality of hinged leaves mounted on said section, the carrier being shown in shifted position with its front in extended relation with respect to its leaves.
Figure 8:
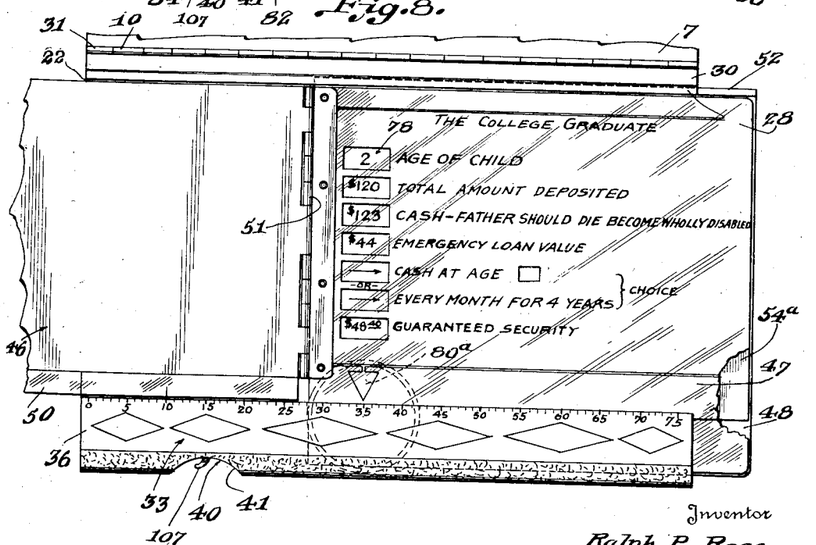
Figure 8 is a view similar to Figure 7, with the front and outer most leaf of the indicia carrier disposed in extended relation with respect to its other leaves for the purpose of exposing designated data for correlation with certain indicia on the carrier.
Figure 9:
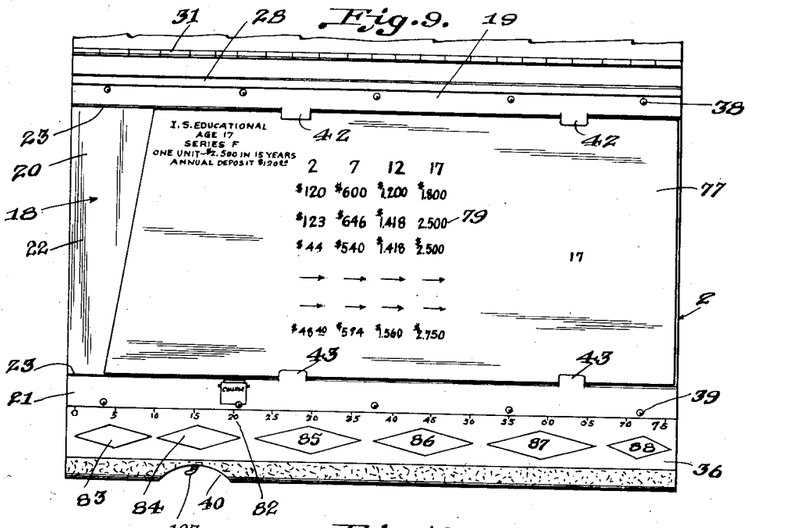
Figure 9 is a view similar to Figure 7 with the carrier removed from and illustrating a data carrying member detachably connected to the housing.

The bottom or base 35 of the strip 33 has its inner face provided with a toothed rack 81, (Figure 6) formed by cutting small, closely spaced slots in the upper edge of the bent portion of strip 21, which is fastened flush against strip 33. The rack 81 is engaged by the teeth of disc 55. The side part 36 of strip 33 is provided with an age scale 82 of from 0 to seventy-five, with each year indicated thereon and which associates with the scale 57. The said side part 36 is also provided with differently colored conventional means, as at 83, 84, 85, 86, 87 and 88, arranged relative to scale 82 for indicating the childhood, preparation, golden age, conservation, declining and retirement age periods, respectively, of life.

The outer face of the closure 12 has arranged thereon a pair of spaced oppositely disposed parallel resilient flanged strips 89, 90 anchored, as at 90a, to said closure 12. The flanges of the strips 89, 90 are indicated at 91, 92, respectively, and extend towards each other. These flanges constitute a pair of clamps. The outer face of the closure 12 between the strips 89, 90 may be provided with any suitable indicia, data, scales, etc., which is visible through and protected by a transparent member 93 which is in a slidable position with opposite edges fitting under the flanges 91, 92 on strips 89, 90.

The apparatus includes an insurance data indicator 94 capable of being used interchangeably with indicator 59 on the screw stub shaft 69. This is formed of a stationary outer disc 95 provided with conventionally designated spaced slots 96 and designated spaced openings 97, an intermediate revoluble disc 98 having non-designated slots and openings which correspond in form and arrangement to the slots and openings of disc 95, and an inner revoluble disc 99 which is not provided with slots and openings. Discs 98, 99 have their front faces provided with spaced data for setting forth information relative to insurance. The data on disc 98 are selectably exposible through the slots and openings in the disc 95. The data on the disc 99 are selectably exposible through the slots and openings in the discs 95, 98. The discs 98, 99 have extended finger tabs 102 to facilitate the revolving thereof. The disc 95 is anchored stationary to leaf 46 when this form of indicator is used on the apparatus in lieu of indicator 59.

The data upon the cards 54a, 77 are shown by way of example, but it is to be understood that such data may be as desired. This statement also applies to the data on the two indicators. The carrier 44 is slidably mounted in the grooves 29, 37 and extends across the groove 22. A card 77, when used, is arranged in groove 22 and retained therein by the tongues 42, 43. The card 54a, when used, is retained against the front of leaf 48 by the retainers 52, 54. When the cards 54a, 77 and indicator 94 are not in use, they are stored in compartment 11. The indicators on the rotatable disc 55 are exposed at the cutout 80a in card 54a.

Figures 1, 2, 3, 4:
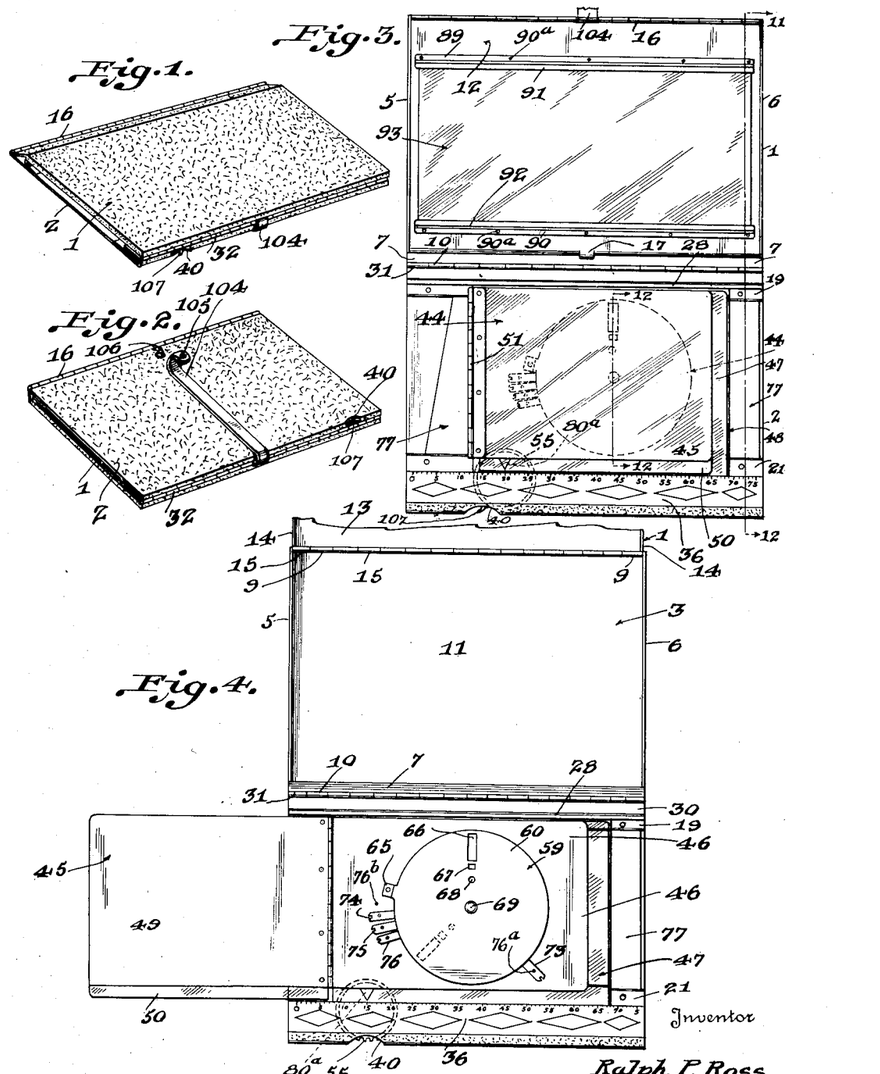
Figure 1 is a perspective view of the apparatus, when closed and looking towards the front side thereof.
Figure 2 is a view similar to Figure 1 looking towards the rear side of the apparatus.
Figure 3 is an elevation looking towards the inner face of a sectional housing for the elements of the apparatus when the housing is in open extended position.
Figure 4 is a view similar to Figure 3 with a pair of the elements of the apparatus extended from the housing.
Figure 5:
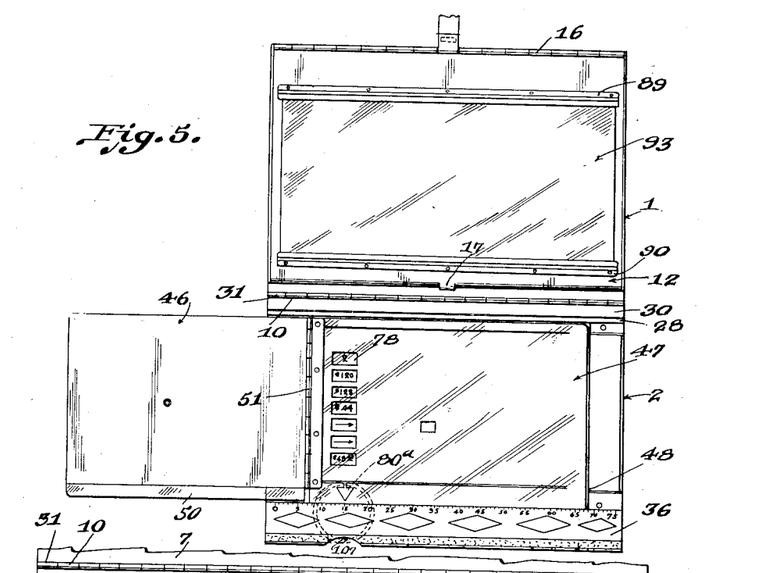
Figure 5 is a view similar to Figure 3 with certain of the elements of the apparatus disposed in extended relation with respect to one of the sections of the housing.
Figure 16:
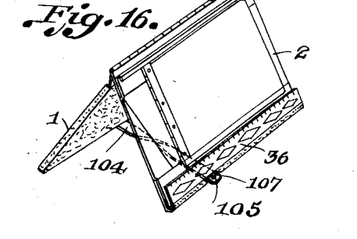
Figure 16 is a perspective view of the apparatus when in position for displaying informational data.

The housing sections have coacting means for latching them closed, as shown in Figures 1 and 2, and in extended position, as shown in Figure 16. The said coacting means consists of a strap 104 fastened at one end by looping and sewing it around pintle 16. A barrel 9 or 15 is removed to provide for looping the strap relative to the pintle. The other end of strap 104 carries the female member 105 of a snap fastener. The section 2 of the housing has secured to its outer face, at a point near the pintle 16, the male member 106 of the snap fastener. The members of the snap fastener coact with the strap for maintaining the sections of the housing closed. When the apparatus is open, setting on a desk in the position for demonstrating, as is shown by Figure 16, the strap 104 is reversed and turned with a one-half twist so that a finger 107 carried by housing section 2 engages in the fastener member 105, whereby the housing sections are prevented from spreading when they are in the position shown in Figure 16.

The purpose of the toothed disc 55 is to indicate death or retirement at a given age. This is indicated when the black spot on the disc appears under the triangular cutout in 54a, as the disc is revolved while the slider is being moved forward.

*Example 1.*—A demonstration is being made to a man, age 30, who has a child aged 2, to illustrate a life insurance educational endowment which carries $2,000 life insurance on the father and which matures for $2,000 when the child reaches age 17. Before proceeding with the demonstration, the agent moves the disc 55 with his thumb until the figure 40 appears at the bottom of the apparatus, seen through the curved cutout 40. By thus setting the disc, the agent knows in advance that the black spot 58 will appear through the triangular opening in part 54a when this triangle (which is the age indicator) comes to age 40 on the age scale 82. The agent then proceeds with his demonstration, and when the pointer or triangle arrives at age 40, the black spot appears, symbolizing the "blotting-out" of the father's life. This is a graphic illustration of the sudden manner in which death may strike, and when this occurs, it is pointed out to the prospect that $2000 will be immediately paid to the beneficiary of the policy. The prospect is made to see this by the figure $2,000 which is printed on sheet 77 in such a position that it appears through the third window from the top in sheet 54a showing "Cash—if father should die or become wholly disabled".

*Example 2.*—A demonstration is being made to a man who desires to create a retirement fund through a systematic installment savings plan. In this case, the salesman wishes to emphasize the fact that at age 65 the prospect will likely become incapacitated through old age infirmity, a condition sometimes described as "living death". Accordingly, before starting the demonstration, while the slider is stationary with a portion of disc 55 showing through cutout 40, the salesman revolves the disc with his thumb until the small figure 65 appears directly at the bottom. It is now in a position so that the black spot 58 will pass under the triangular window in 54a when said window arrives at age 65 on the age scale 82. The purpose of this part of the demonstration is to intensify the changed condition of the prospect's life at age 65 by visual means, thus tending to emphasize the need for the benefits which will be available at said age through the maturity of the recommended plan of savings.

*Example 3.*—In illustrating a health and/or accident insurance policy, the indicator or black spot 58 on disc 55 will be used to represent an unexpected misfortune, such as sudden accident or sudden disability through sickness. The position of the disc may be arranged in advance by the agent, as described above, so that the indicator or black spot will pass under the triangular window at any desired point along the age scale 82, such point being determined by the salesman so as to best illustrate the plan being demonstrated to the prospect.

However used, the purpose of disc 55 and black spot 58 is to portray either a cessation or an important changed condition in the life of the prospect at a certain predetermined age, and to stress said cessation or changed condition by a novel, mechanical and visual means, in order to lay special emphasis on the need for the benefits proposed by the agent as compensation for said cessation or changed condition of life.

The scale 82 represents the age span of a person being interviewed. The figures shown in this scale are from 0 to 75, in periods of 5 years, but four dots are shown between each pair of figures, each dot representing one year on the scale.

As the slidable carrier 44 is moved from left to right, the triangular window cutout in sheet 54a indicates by its lower point the constantly advancing age of the prospect, emphasizing the fact that life is not stationary, but that a person is constantly becoming older. In other words, such movement illustrates the truth of the statement that "the years roll by". This visual demonstration is of great value in the sale of life insurance or long term investments in that it increases the awareness of the prospect for his need of the special plan or service offered.

*Example of use.*—The age scale is used in relation to the figures appearing through windows in card 54a. Referring to Example 1, when this triangular window, which is also an age indicator, rests at the figure 40 on age scale 82, all the figures then appearing through the row of windows 53 describe the exact status of the plan or policy under consideration as it will be when the prospect attains an age of 40. It must be understood that to make this work out correctly, the card 77 on which said figures are printed, must be shifted into the correct position before the demonstration starts so that the first vertical row of said figures will appear in said row of windows 53 at the present or starting age of the prospect, which, in the example referred to, is age 30.

*Periods 83 to 88 inclusive.*—The purpose of displaying these periods prominently is to make possible a quick visual demonstration of the natural age periods in a person's life, with special reference to the creation of an estate, saving money for certain purposes and the probability of death. The use of a different color for each period assists in differentiating between said periods, and the colors used are, in a measure, symbolical of the characteristics of the period indicated.

*Example of use.*—It is pointed out while interviewing a man who is now aged 30 that he is in the prime of life, or what is termed the "golden age". Reference to the designated periods impresses this man with the fact that he has passed through the periods of childhood and preparation, but further reminds him that he will soon be approaching the age of conservation, quickly followed by declining earning ability and perhaps declining health, and finally the age of retirement. As the prospect's age consciousness is thus intensified, his desire for the benefits of the proposed plan is likewise quickened. Further, he is made to realize that his "life expectancy" is becoming constantly shorter. This part of the whole visual demonstration is of material aid to the salesman or agent in that it assists him in moulding his prospect's mind into a favorable attitude toward the plan or policy under consideration.

*The purpose of card 77.*—This card is a means for carrying ready-printed data or data to be written by the operator, pertaining to a certain policy of insurance or other long term financial plan, and to show said data in its true relation to various ages of a certain interested prospect. Said data consist of the more important values of the plan under consideration and are arranged on the card in vertical rows so that they will be visible at five year intervals through the "viewing windows" in sheet 54ª as said sheet is passed over card 77 from left to right.

*Example of use.*—In demonstrating the educational plan, headed I. S. Educational, Age 17, on card 77, it is assumed that the child is age 2 while the father is age 30. The triangular pointer is set at figure 30 on the age scale and while in this position, the first vertical row of figures on card 77 may be read through windows 53 in sheet 54ª. These figures are the specifications of the educational plan at the end of the first year.

Leaving card 77 stationary in groove 22, held firmly in place by fingers 42, 43, move the sliding section containing sheet 54ª to the right until the lower point of the triangular window in sheet 54ª points to figure 45 on the age scale 82. This indicates that the father has now attained the age of 45. The figures now appearing through the vertical row of windows 53 in sheet 54ª pertain to the educational plan at its maturity, which is the end of the fifteenth year. Reading from top to bottom, the prospect quickly sees that: The age of the child is now 17; total amount deposited is $1,800; cash, if father should die or become wholly disabled, is $2,500; emergency loan value is $2,500; that a choice may be made at age 17 between $2,500 cash or a monthly income of $55.19 per month for four years; also, that the guaranteed security is $2,750.

The sole purpose of card 77 is to carry data which describe the policy or plan under consideration, said data to be viewed through descriptive windows in sheet 54ª. Said data are generally printed in vertical columns so it will appear in said windows at five year intervals on the age scale 82, because if the attempt is made to show same at less than five year intervals, it would require the windows 53 and the figures 79 on card 78 to be made too small for a practical demonstration.

*Purpose of cutout, slot or window 80ª.*—This space is really a window cut out in sheet 54ª, and will be punched in every other substitute sheet, always in the same position as shown. The size and positions of the rectangular windows in these sheets will vary greatly, as well as the printing on said sheets, but the size and position of the triangular window will not change for the following reason:

This triangular window is a symbol of life, a pointer and a connecting link between the age scale 82 and the miscellaneous data printed on card 77 and appearing from time to time through windows 53 in sheet 54ª. The yellow face of disc 55 normally forms a yellow background for said triangular window, but in a certain position, the black spot 58 on said disc becomes the background for said triangular window, indicating death, disability, retirement or some other changed condition in the prospect's life, according to the interpretation of the demonstrator. See examples designated 1, 2 and 3.

The sole purpose of cutout 40 is to afford convenient means of manually moving or rotating the toothed disc 57 into any desired position before the commencement of a demonstration. The circumstances which make such manual adjustment of said disc necessary and advisable are fully set forth in examples designated 1, 2 and 3.

*Purpose of space designated "college".*—To insure the availability of adequate funds to pay for a child's college education when the child attains college age is a matter of great concern to many fathers. If a man dies before his child is ready for college, he wants his life insurance proceeds to be sufficient and so arranged as to provide funds for this purpose; if he lives, he wants to accumulate a sum of cash for the purpose.

In making a demonstration to a man with children, the salesman or agent first moves the slider to a position where the triangular pointer rests on the father's present age, on age scale 82. He then inquires the age of the child and makes an ink mark, dot or line on the lower edge of the transparent leaf 49, at the point where such mark coincides with the figure representing the child's age on the age scale 82. If there is more than one child, a similar ink mark is made for each child at the proper position. Then, as the sliding section 44 is moved to the right, the demonstration shows not only the father's increasing age, but also and simultaneously it shows the mark or marks indicating the child or children approaching the figure marked "college" which is stamped permanently on the apparatus between the ages 18 and 22, because this is the period, normally, when a boy or girl is attending college.

By thus picturing the college in its correct, normal position adjacent to the age scale 82, and moving the children toward said college while the father's age increases, a most impressive picture is placed before the prospect. When the slider has been moved to a position showing the mark representing the child "entering" college at age 18, the prospect's attention is directed to the windows in card 54ª, and the figures appearing in said windows, which show exactly the amount of cash or monthly income available to pay college expenses for the child who is plainly pictured as just entering the college.

The tabs 73, 74, 75 and 76 are provided with openings 76ª adapted to releasably receive lugs or pins 76ᵇ carried by the leaf 46 for the purpose of latching the discs from movement in relation to each other. When it is desired to move a selected disc relative to the other discs the tab of such selected disc is moved off of a lug.

What I claim is:—

1. In an apparatus for displaying informational indicia, a housing formed of a cover section and a body section hingedly connected together, one of said sections having on its inner face a pair of oppositely disposed aligned grooves, a bodily slidable indicia carrier of book-like form including a front, a back and a pair of leaves hingedly connected together, the said back adapted to have detachably connected thereto a slotted data designating card, the innermost leaf and said back being of greater area than the other leaf and said front and slidably mounted in said grooves for connecting the carrier to the housing, one of said grooves of said pair being of greater depth than the other one, the said grooved section being formed with visible scale forming means, a rotatable toothed disc bodily carried by and extended from said back, traveling in the groove of greatest depth and carrying selectable indicators for coaction with said means, a rack secured to the base wall of the groove of greatest depth engageable by the teeth of said disc for revolving the latter, and said grooved section having means to allow for the exposure of the indicators selected on the revolving of said disc to coact with said means.

2. In an apparatus for displaying informational indicia, a slidable indicia carrier of book-like form including a front, back and leaves hingedly connected together and a disc rotatably connected to said back, said disc being provided on one face with an age scale and an indicator, a data designating card for removable connection to said back and provided with a window for exposing an age indicator of said scale and the said indicator on the rotation of the disc, and a supporting means having opposed parts for slidably connecting the carrier thereto, one of said parts extended over a portion of said card, said disc and back and having means for rotating the disc on the sliding of the carrier.

3. In an apparatus for displaying informational indicia, a slidable indicia carrier of book-like form including a front, back and leaves hingedly connected together, a plurality of hinged leaves and a disc rotatably connected to said back, said disc being provided on one face with an age scale and an indicator, a data designating card for removable connection to said back and provided with a window for exposing an age indicator of said scale and the said indicator, a supporting means having opposed parts for slidably connecting the carrier thereto, one of said parts extended over said card, said disc and back, said disc being toothed, and that part extended over the disc provided with a rack for rotating the disc on the shifting of the carrier relative to said means.

4. In an apparatus for displaying informational indicia, a housing formed of a cover section and a body section connected together, said sections capable of being arranged in extended relation, one of said sections having means for detachably connecting therewith an information indicia carrying element, a bodily shiftable indicia carrier of book-like form for positioning over said element and including a front, a leading leaf, a follower leaf and a back hingedly connected together, said front formed of an opaque portion and a transparent portion extended from the bottom of the said opaque portion, said leading leaf corresponding in size to said opaque portion and adapted to have an indicator connected thereto concealed by said opaque portion, said follower leaf being transparent and of greater area than and extended from the bottoms of said front and leading leaf, said back being of greater area than said follower leaf and being formed with a large slot and spaced means for detachably connecting a slotted information indicia carrying element connected to the front thereof, and said body section provided with means on its inner face coacting with said follower leaf and back for slidably connecting the carrier thereto and whereby when the carrier is open and shifted to a selected point it will provide for the exposing of coacting selected data from said elements.

5. In an apparatus for displaying informational indicia, a housing formed of a cover section and a body section connected together, said sections capable of being arranged in extended relation, one of said sections having means for detachably connecting therewith an information indicia carrying element, a bodily shiftable indicia carrier of book-like form for positioning over said element and including a front, a leading leaf, a follower leaf and a back hingedly connected together, said front formed of an opaque portion and a transparent portion extended from the bottom of the said opaque portion, said leading leaf corresponding in size to said opaque portion and adapted to have an indicator connected thereto concealed by said opaque portion, said follower leaf being transparent and of greater area than and extended from the bottoms of said front and leading leaf, said back being of greater area than said follower leaf and being formed with a large slot and spaced means for detachably connecting a slotted information indicia carrying element to the front thereof, said body section provided with means on its inner face coacting with said follower leaf and back for slidably connecting the carrier thereto and whereby when the carrier is open and shifted to a selected point it will provide for the exposing of coacting selected data from said elements, and an indicator and age scale carrying disc rotatably connected to the lower portion of the front face of said back and rotated by said body section on the sliding of the carrier.

6. In an apparatus for displaying informational indicia, a housing including a cover section and a body section connected together and capable of being shifted to extended relation with respect to each other, an informational indicia carrier of book-like form including a front, back and leaves hingedly connected together, an indicating device fixedly secured to one of the leaves of the carrier and including opposed revoluble normally latched selective data carrying discs, the outer ones of the said discs being formed with openings, the data on an inner disc being exposible through an opening in an outer disc when the inner disc is revolved, selectable designating tabs extending from said discs for manually revolving the discs carrying the selective data, said tabs and said leaf having coacting means for latching the discs from movement, and said body portion provided on its inner face with means for connecting the carrier thereto.

7. In an apparatus for displaying informational indicia, a housing including a cover section and a body section hingedly connected together and capable of being shifted to extended relation to each other, an indicia carrying element removably mounted in the inner face of said body section, a bodily shiftable carrier of book-like form including a front, a pair of leaves and a back, said carrier being slidably connected to the inner face of said body section, said back being formed with an opening for exposing indicia on said element, a data designating member for correlation with said element, detachably connected to the front of said back and provided with windows for exposing selected data on said element when the carrier is open, said body section being provided on its inner face with a visible scale-forming means, a rotatable toothed disc bodily carried by said back at the front of the latter and below the opening therein, said disc being provided with selectable indicators for correlation with said scale-forming means, means in said body section and coacting with the teeth of said disc for revolving the latter when the carrier is shifted, and said body section having means for exposing the selected indicator on the revolving of the disc to coact with said scale-forming means.

8. In an apparatus for displaying informational indicia, a housing formed of a cover section and a body section hingedly connected together, one of said sections having on its inner face a pair of oppositely disposed aligned grooves, said section being provided with an age scale and means adapted for rotating an indicator for coaction with said scale, a bodily shiftable informational indicia carrier of book-like form including a front, a back and a plurality of leaves hingedly connected together, a rotatable indicator supported by the carrier, and said back and the leaf next adjacent thereto being extended into said grooves to slidably connect the carrier to said grooved section and to provide for said means rotating the indicator on the shifting of the carrier relative to the housing.

9. In an apparatus for displaying informational indicia, a housing formed of a cover section and a body section shiftably connected together, one of said sections being formed on its inner face with a pair of oppositely disposed spaced parallel grooves and means for detachably connecting therewith between said grooves an informational indicia carrying element, a bodily slidable informational indicia carrier of book-like form for exposing selected indicia when it is open and slid to a selected point, said carrier incuding a front, a slotted back for exposing the indicia on said element and a plurality of leaves connected together in shiftable relation, that leaf immediately preceding the back and the latter being extended into said grooves for slidably connecting the carrier to said grooved section over said element, said body section being formed on its inner face with an additional groove, said back having means for detachably connecting to its inner face a slotted informational indicia carrying element correlating with said other element, and an initially set travelling, revoluble indicating disc associated with the slidable carrier for selecting indicia on its travel and being operated by friction of its edge with the bottom of said additional groove on the sliding of the carrier.

RALPH P. ROSS.